US007035073B2

(12) United States Patent
Bennett et al.

(10) Patent No.: US 7,035,073 B2
(45) **Date of Patent: *Apr. 25, 2006**

(54) CENTRAL OFFICE SURGE PROTECTOR WITH INTERACTING VARISTORS

(75) Inventors: Robert J. Bennett, Lewisville, TX (US); Casimir Z. Cwirzen, Colleyville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/770,201

(22) Filed: Feb. 2, 2004

(65) Prior Publication Data

US 2004/0228064 A1 Nov. 18, 2004

Related U.S. Application Data

(63) Continuation of application No. 10/008,836, filed on Nov. 8, 2001, now Pat. No. 6,687,109.

(51) Int. Cl.
*H02H 3/22* (2006.01)

(52) U.S. Cl. .................................................... 361/119

(58) Field of Classification Search ................ 361/119, 361/118, 120, 125, 129
See application file for complete search history.

(56) References Cited

U.S. PATENT DOCUMENTS

| | | | | |
|---|---|---|---|---|
| 3,852,539 | A | 12/1974 | DeLuca | 179/174 |
| 4,262,317 | A | 4/1981 | Baumbach | 361/124 |
| 4,325,100 | A | 4/1982 | Baumbach | 361/119 |
| 4,327,393 | A | 4/1982 | Hines | 361/119 |
| 4,366,412 | A | 12/1982 | Lang et al. | 313/325 |
| 4,723,190 | A | 2/1988 | Chung | 361/91 |
| 4,730,229 | A | 3/1988 | De Luca et al. | 361/119 |
| 4,733,325 | A | 3/1988 | Loesch | 361/119 |
| 4,736,269 | A | 4/1988 | Amein et al. | 361/128 |
| 4,796,150 | A | 1/1989 | Dickey et al. | 361/119 |
| 4,845,580 | A | 7/1989 | Kitchens | 361/91 |
| 4,860,156 | A | 8/1989 | Stenstrom et al. | 361/128 |
| 4,912,592 | A | 3/1990 | Flindall et al. | 361/120 |
| 4,944,003 | A | 7/1990 | Meyerhoefer et al. | 379/412 |
| 4,958,254 | A | 9/1990 | Kidd et al. | 361/119 |
| 4,984,125 | A | 1/1991 | Uwano | 361/124 |
| 5,008,772 | A | 4/1991 | Neuwirth et al. | 361/119 |
| 5,025,345 | A | 6/1991 | Marks | 361/119 |
| 5,031,067 | A | 7/1991 | Kidd et al. | 361/119 |
| 5,064,997 | A | 11/1991 | Fang et al. | 219/505 |
| 5,224,012 | A | 6/1993 | Smith | 361/119 |
| 5,319,515 | A | 6/1994 | Pryor et al. | 361/93 |
| 5,333,193 | A | 7/1994 | Cote et al. | 379/399 |
| 5,388,023 | A | 2/1995 | Boy et al. | 361/129 |
| 5,416,663 | A | 5/1995 | Atkins | 361/119 |
| 5,500,782 | A | 3/1996 | Oertel et al. | 361/120 |
| 5,557,065 | A | 9/1996 | Brower et al. | 174/52.3 |
| 5,623,388 | A | 4/1997 | Chaudhry | 361/119 |
| 5,625,519 | A | 4/1997 | Atkins | 361/93 |
| 5,808,849 | A | 9/1998 | Storbeck | 361/119 |

(Continued)

*Primary Examiner*—Brian Sircus
*Assistant Examiner*—Boris Benenson
(74) *Attorney, Agent, or Firm*—Michael E. Carroll, Jr.

(57) ABSTRACT

A central office surge protector having at least one gas tube and at least one varistor. The at least one varistor interacts with the at least one gas tube to lower the impulse breakdown voltage of the gas tube. The at least one gas tube may be a two or a three element gas tube. Alternative embodiments of the surge protector further include at least one sneak current protection element.

12 Claims, 8 Drawing Sheets

U.S. PATENT DOCUMENTS 5,880,919 A 3/1999 Napiorkowski et al. .... 361/117
5,909,349 A 6/1999 Brower et al. .............. 361/117
5,999,393 A 12/1999 Brower ........................ 361/117
6,084,761 A 7/2000 Casey et al. ................ 361/119
6,178,080 B1 1/2001 Wilken et al. .............. 361/119
6,327,129 B1 12/2001 Oertel et al. ................ 361/118
6,421,218 B1 7/2002 Vo et al. ..................... 361/117
6,687,109 B1 * 2/2004 Bennett et al. ............. 361/119

* cited by examiner

A
10
56
54
52
58b
58
58a
58b
50
50a
23
30
40
23a
52
54
56a
56
56b
27
21
31
22
20
15
25
17
13
14
26
16
12a
12
8
A

Fig. 2
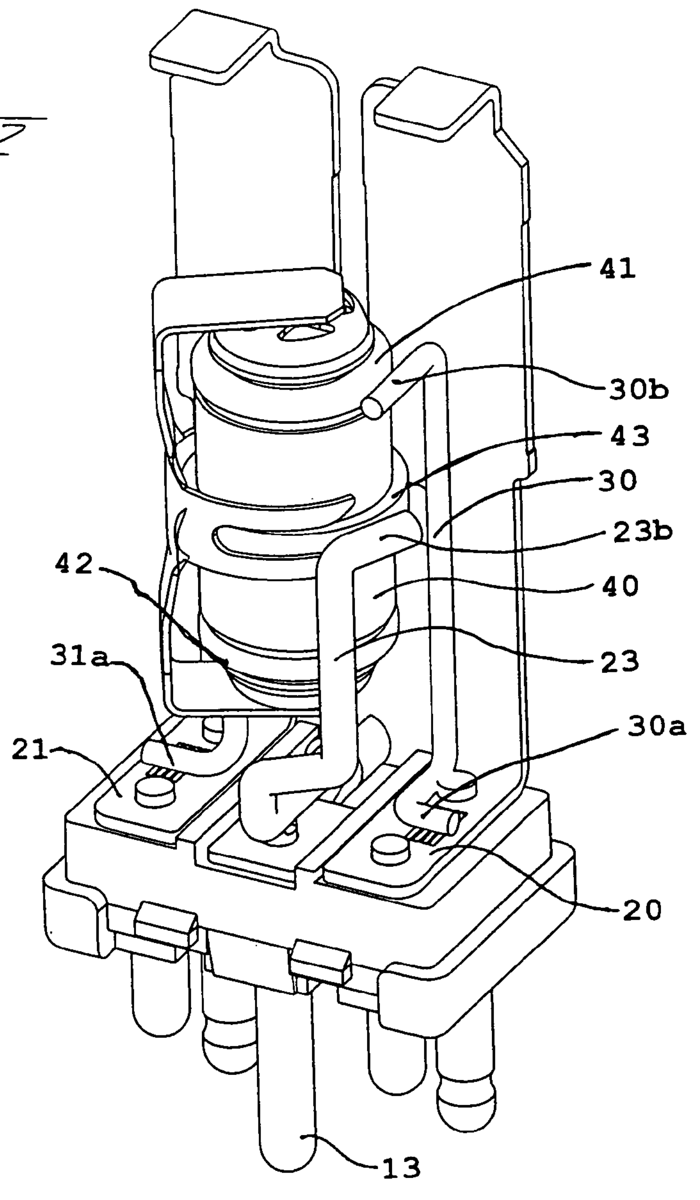
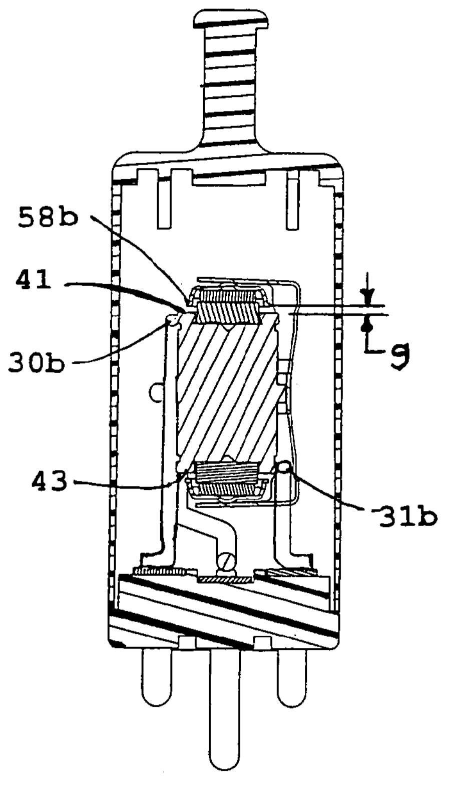
Fig. 2a

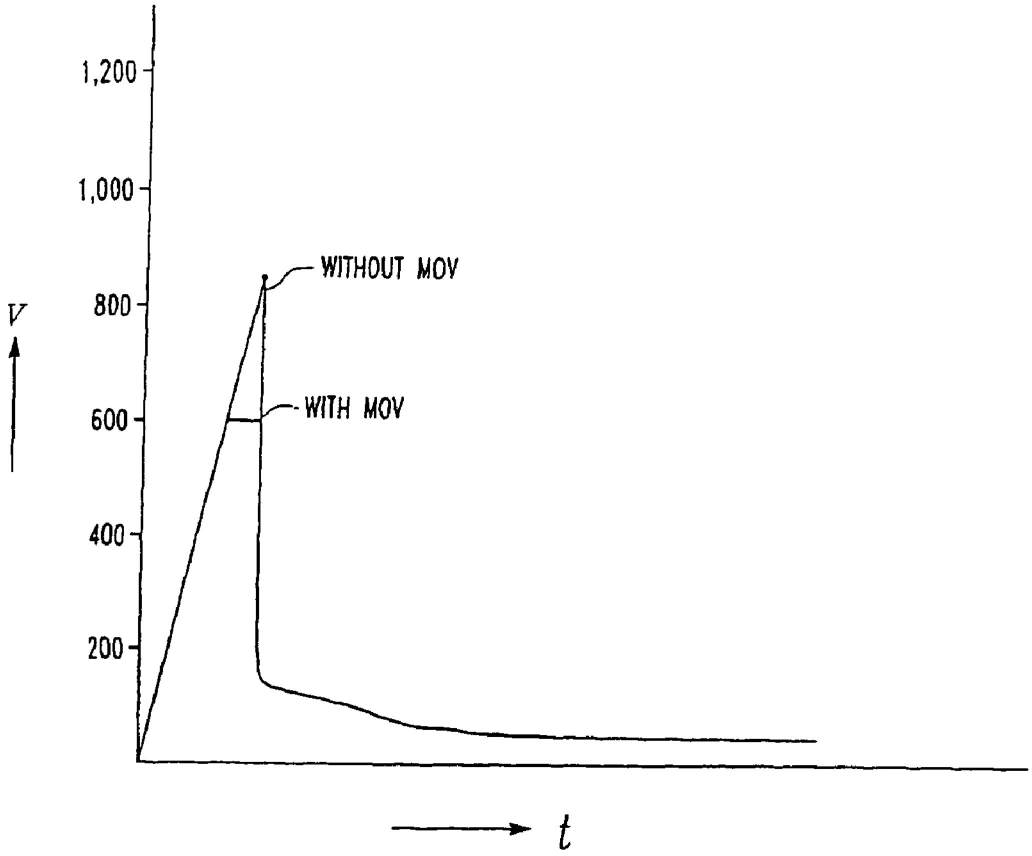
Fig. 5
Fig. 13
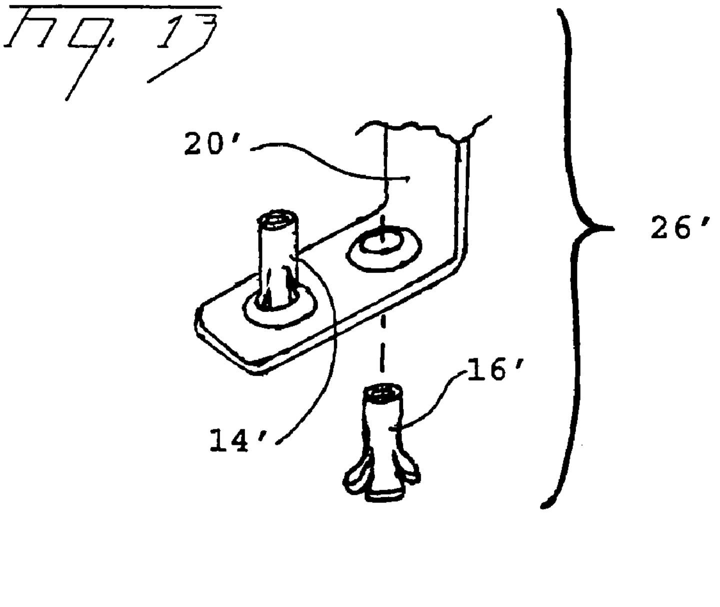

Fig. 7
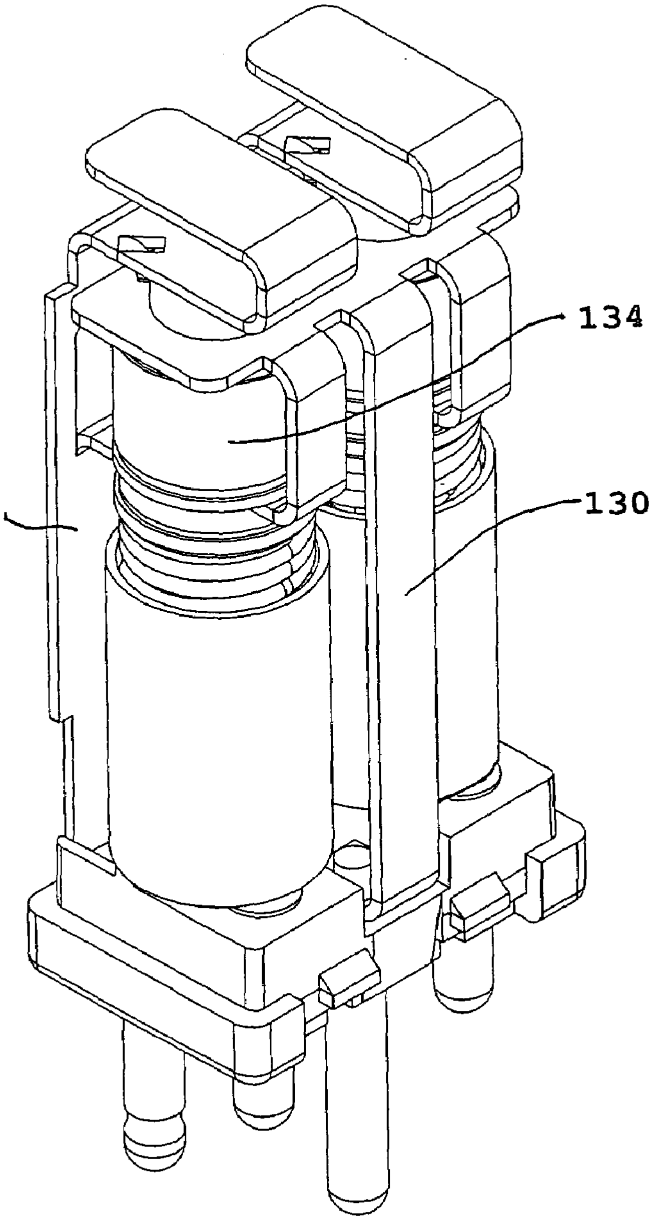
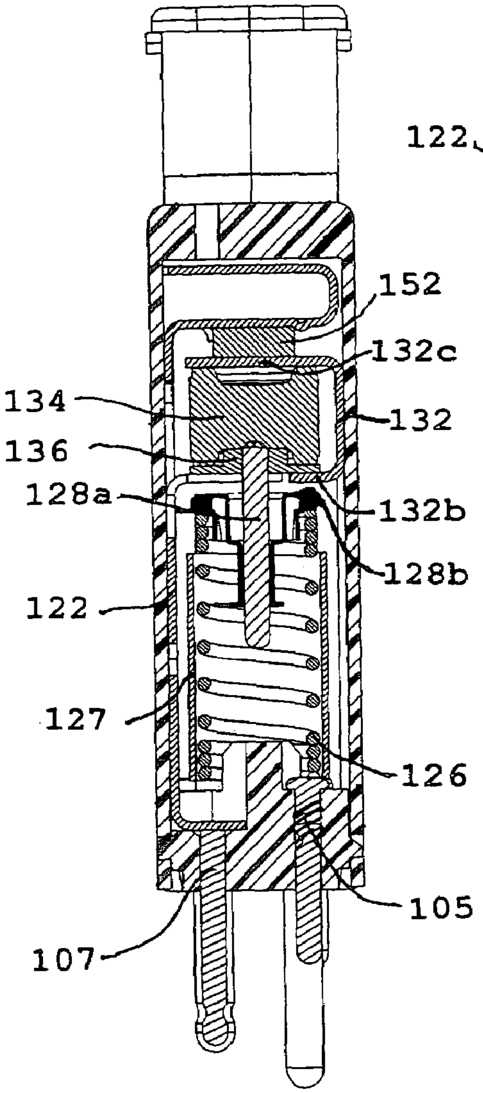
Fig. 8

Fig. 10
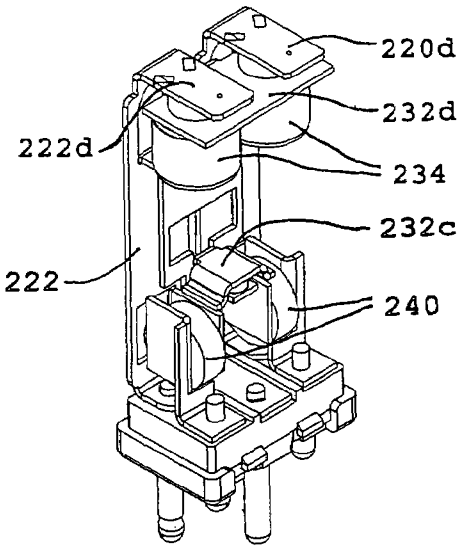
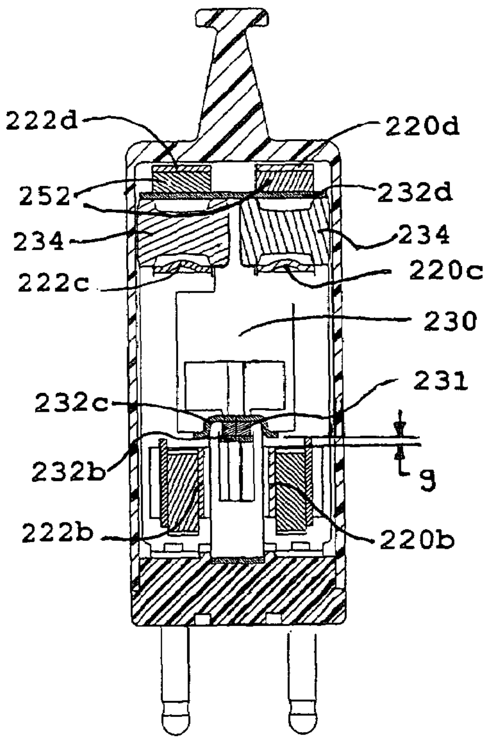
Fig. 11
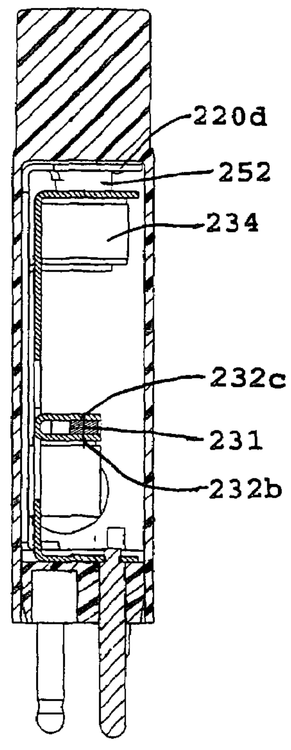
Fig. 12

CENTRAL OFFICE SURGE PROTECTOR WITH INTERACTING VARISTORS

RELATED APPLICATIONS

The present application is a Continuation of U.S. Ser. No. 10/008,836 filed on Nov. 8, 2001 now U.S. Pat. No. 6,687,109, which is incorporated herein by reference.

FIELD OF THE INVENTION

The present invention relates generally to surge protectors for use with, for example, telecommunication lines. More particularly, the invention relates to a surge protector with interacting varistors for use in a telephone central office.

BACKGROUND OF THE INVENTION

Wired telecommunications rely on telephone lines to facilitate voice and data transmissions. Because of the proliferation of uses for telephone lines, there has been a growing concern to protect operating personnel and/or connected communications equipment from excessive voltages and currents. Excessive voltages and currents may be caused by, for example, lightning strikes, power line crosses, and/or currents induced from adjacent power lines.

Primary telecommunications protectors, at a minimum, provide overvoltage protection. This is typically done with at least one protection element that is inserted between a conductive tip element of a surge protector and ground. Likewise, typically at least one protection element is inserted between a conductive ring element of the surge protector and ground. When a hazardous overvoltage is present on a line, the overvoltage protection element changes from a high impedance to a low impedance state, effectively shorting the hazardous overvoltage and its associated overcurrent to ground and away from equipment and/or personnel.

There are occasions when an excessive current may be present with no overvoltage. This is typically called a "sneak current" and may occur when there is AC induction on the line or when the tip and ring conductors are somehow shorted, or nearly shorted, to ground. During such a condition, the overvoltage protection element may not short to ground, thereby allowing hazardous overcurrents to pass by the protector to the equipment and/or personnel. Over time, the sneak current condition may cause excessive damage to the telecommunications equipment.

SUMMARY OF THE INVENTION

The present invention is directed to a central office surge protector including a tip element, a ring element, a ground element, and at least one pin. The at least one pin is electrically connected to one of the tip element, the ring element and the ground element. The central office surge protector also includes at least one gas tube having an electrode in electrical contact with at least one of the tip and ring elements, the at least one gas tube having a DC breakdown voltage and an impulse breakdown voltage that is higher than the DC breakdown voltage, and at least one varistor, wherein the at least one varistor and the at least one gas tube are electrically connected in parallel to the ground element. The at least one varistor having a clamping voltage at 1 mA being set such that the varistor will lower the impulse breakdown voltage of the at least one gas tube, yet not burn out in response to surge voltages within a predetermined range of DC breakdown voltages.

The present invention is also directed to a central office surge protector including a tip element, a ring element, a ground element, and at least one pin. The at least one pin is electrically connected to one of the tip element, the ring element and the ground element. The central office surge protector also includes at least one gas tube having at least one electrode in electrical contact with at least one of the tip and ring elements, the at least one gas tube having a DC breakdown voltage and an impulse breakdown voltage that is higher than the DC breakdown voltage, at least one sneak current protection element, and at least one varistor, wherein the at least one gas tube and the at least one varistor are electrically connected in parallel to the ground element. The at least one varistor having a clamping voltage at 1 mA being set such that the varistor will lower the impulse breakdown voltage of the at least one gas tube, yet not burn out in response to surge voltages within a predetermined range of DC breakdown voltages.

The present invention is still further directed to a central office surge protector including a tip element, a ring element, a ground element, and at least one pin. The at least one pin is electrically connected to one of the tip element, the ring element and the ground element. The central office surge protector also includes at least one gas tube having an impulse breakdown voltage and a DC breakdown voltage and at least one varistor. The DC breakdown voltage of the gas tube being in a range between a predetermined minimum and maximum value, and the impulse breakdown voltage being higher than the predetermined maximum DC breakdown voltage. The at least one varistor and at least one gas tube are electrically connected in parallel to the ground element. The at least one varistor having a clamping voltage at 1 mA between the predetermined minimum and maximum DC breakdown voltages of the at least one gas tube such that the varistor clamps the voltage during a voltage surge to reduce the impulse breakdown voltage of the gas tube without the varistor burning out.

BRIEF DESCRIPTION OF THE DRAWINGS

FIG. 2 is a perspective view of the central office surge protector of FIG. 1 as assembled and shown with the cover removed.

FIG. 2*a* is a partial sectional view of the central office surge protector of FIG. 1 as assembled.

FIG. 5 is an exemplary graph illustrating the interaction of a varistor and a gas tube in responding to a voltage surge over time.

FIG. 7 is a perspective view of the central office surge protector of FIG. 6 as assembled and shown with the cover removed.

FIG. 8 is a sectional view of the central office surge protector of FIG. 6 as assembled and taken through the ring element.

FIG. 10 is a perspective view of the central office surge protector of FIG. 9 as assembled and shown with the cover removed.

FIG. 11 is a sectional view of the central office surge protector of FIG. 9 as assembled.

FIG. 12 is a sectional view of the central office surge protector of FIG. 9 as assembled and taken through the ground element.

FIG. 13 is a perspective view of a portion of the tip arm of a further embodiment according to the present invention.

DETAILED DESCRIPTION OF THE INVENTION

Figure 1:
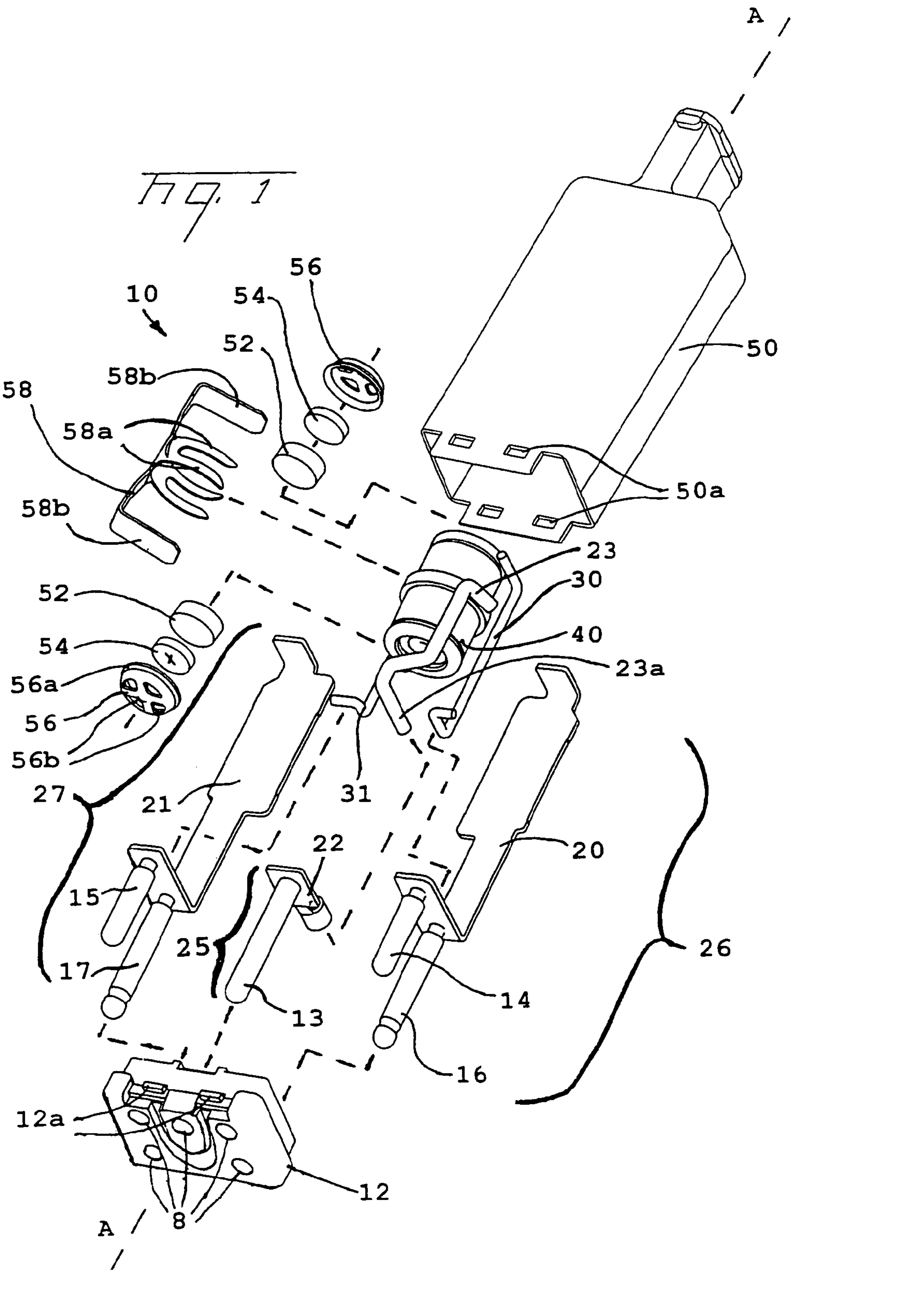
FIG. 1 is an exploded perspective view of a central office surge protector of one embodiment according to the present invention.

Illustrated in FIGS. 1–2*a* is a protector 10 according to the present invention. Protector 10 is commonly referred to as a central office surge protector and is typically inserted into a connector block at a telephone central office to protect central office lines and equipment from being damaged by voltage surges caused, for example, by lightening or power crosses.

In one embodiment, protector 10 includes a dielectric base 12 having a plurality of electrical inputs and outputs attached and/or inserted therethrough. More specifically, each particular pin, a ground pin 13, a central office tip pin 14, a central office ring pin 15, an outside plant tip pin 16, and an outside plant ring pin 17 are inserted into a corresponding aperture 8 formed through base 12. Tip pins 14 and 16 are attached and electrically connected to a first end of a tip arm 20 forming a tip element 26. Attaching pins 14 and 16 to tip arm 20 simplifies the manufacture and assembly of protector 10. Likewise, ring pins 15 and 17 are attached and electrically connected to a first end of a ring arm 21 forming a ring element 27. The tip element 26 and/or ring element 27 may be a single component element or a multiple component element.

A tip lead 30 includes a first end 30*a* and a second end 30*b*. First end 30*a* of tip lead 30 is electrically connected to a portion of tip arm 20. Second end 30*b* is electrically connected to a first lead electrode 41 of a three-element gas tube 40 that is arranged generally parallel to the longitudinal axis A of protector 10. Likewise, a ring lead 31 includes a first end 31*a* and a second end 31*b*. First end 31*a* of ring lead 31 is electrically connected to a portion of ring arm 21 and second end 31*b* of ring lead 31 is electrically connected to a second lead electrode 42 of gas tube 40. A ground element 25, capable of being grounded, includes a ground pin 13 that is electrically connected to a ground arm 22. Ground element 25 may be a single component element or a multiple component element. Ground arm 22 is electrically attached to a first end 23*a* of a ground lead 23. A second end 23*b* of ground lead 23 is electrically connected to a ground electrode 43 of gas tube 40 (FIG. 2).

Alternative embodiments of the present invention may, for example, include a pair of two-element gas tubes in place of three-element gas tube 40. However, ground lead 23 that is electrically connected to ground electrode 43 of gas tube 40 may require modification to accommodate a pair of two-element gas tubes. For example, one gas tube is electrically connected to the tip element 26 and the other gas tube is electrically connected to the ring element 27. The other electrodes of the pair of two-element gas tubes are electrically connected to a ground plate that replaces ground lead 43.

On each end of gas tube 40 is a varistor 52, a fusible element 54, and an end cap 56 that are held in place by a spring clip 58. More specifically, spring clip 58 is electrically attached to gas tube 40 by medially arranged forked clamps 58*a* of spring clip 58. At least one retention arm 58*b* of spring clip 58 biases varistor 52, fusible element 54, and end cap 56 towards the respective lead electrode 41 and/or 42 of gas tube 40. As an alternative arrangement, fusible elements 54 can be positioned between gas tube 40 and varistor 52, however, operating characteristics may vary due to the proximity of fusible element 54 with respect to gas tube 40. End caps 56 may be hollow cylindrical or slightly conical open caps with a flange-like edge 56*a* and a plurality of apertures 56*b* formed therethrough. The diameter of flange-like edges 56*a* may generally correspond to the diameter of lead electrodes 41, 42 of gas tube 40. Preventing contact between flange-like edges 56*a* of end caps 56 and lead electrodes 41,42 of gas tube 40 is a gap g (FIG. 2*a*) having a dimension of, for example, about 0.2 mm to about 0.3 mm. The distance of the gap g is determined by the thickness of varistor 52 and/or fusible element 54. A cover 50 attaches to base 12 to protect the internal components of protector 10 from adverse environmental effects and to enhance personnel safety. Cover 50 can be attached by suitable means, for example, protrusions 12*a* on base 12 that correspond to apertures 50*a* on cover 50.

Figure 3:
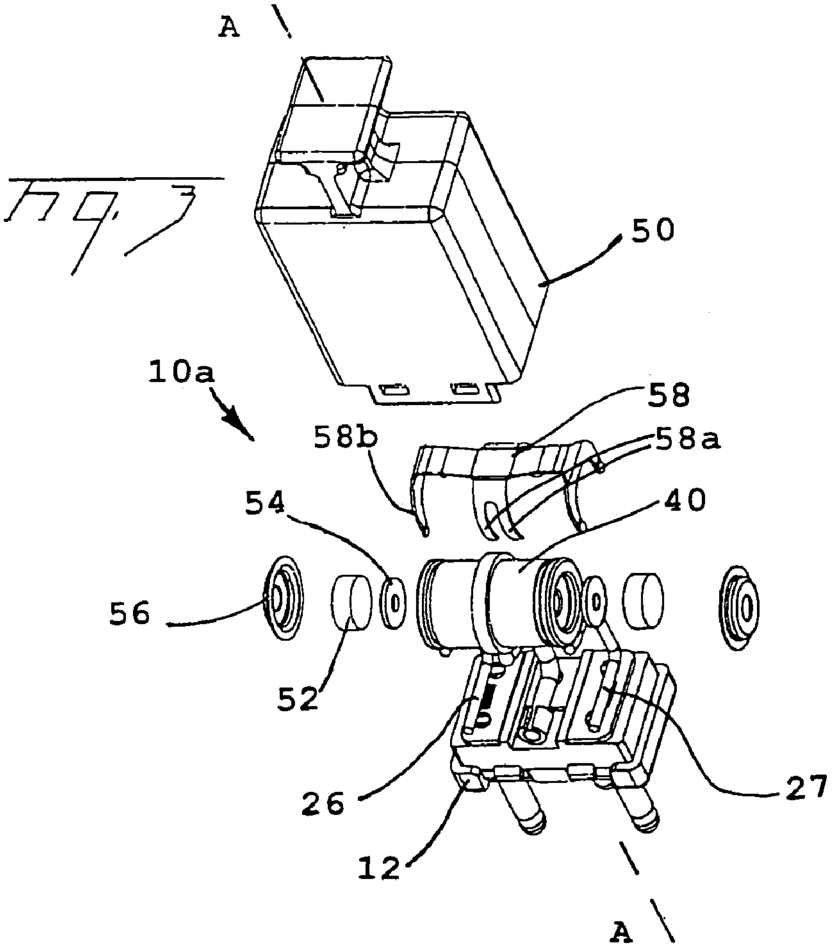
FIG. 3 is an exploded perspective view of a central office surge protector of another embodiment according to the present invention.
Figure 4:
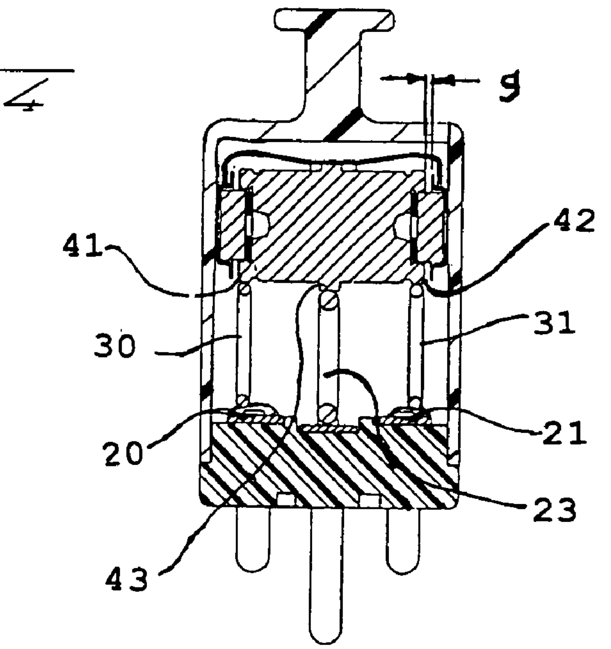
FIG. 4 is a sectional view of the central office surge protector of FIG. 3 as assembled.

In other embodiments of the present invention, the internal components may be rearranged. For example, the gas tube may be in a generally horizontal position with respect to the longitudinal axis A of the protector. FIGS. 3 and 4 illustrate an exemplary protector 10*a* similar to protector 10 in which like reference characters will be used to describe similar elements. Protector 10*a* includes tip element 26 and ring element 27 insertable into base 12. Tip element 26 includes central office tip pin 14 and outside plant tip pin 16 electrically attached to tip arm 20, as previously described. Tip arm 20 is in electrical contact with tip lead 30. Tip lead 30 is also electrically connected to first lead electrode 41 of gas tube 40. Likewise, ring element 27 includes central office ring pin 15 and outside plant ring pin 17 electrically attached to ring arm 21, as previously described. Ring arm 21 is in electrical contact with ring lead 31. Ring lead 31 is also electrically connected to a second lead electrode 42 of gas tube 40. Ground lead 23 is electrically connected to ground pin 13, as previously described. Ground lead 23 is also electrically connected to a ground electrode 43 of gas tube 40. On each end of gas tube 40 is a fusible element 54, a varistor 52, and an end cap 56 that are held in place by a spring clip 58.

In normal operation electrical current flow is from outside plant tip pin 16 through electrically conductive tip arm 20 to central office tip pin 14. Likewise, during normal operation electrical current flow is from outside plant ring pin 17 through electrically conductive ring arm 21 to central office ring pin 15. Fusible element 54, for example, a solder pellet, provides a thermal overload short to ground. However, other suitable fusible elements, for example, meltable plastics may be used. Specifically, when one of the fusible elements 54 reaches a predetermined temperature, end cap 56 is biased axially inward toward gas tube 40 by spring clip 58. The melted material of the fusible element 54 may flow through apertures 56*b* of end cap 56. When end cap 56 is biased axially inward by spring clip 58 and electrically contacts lead electrode 41 or 42 of gas tube 40 the signal is conducted to ground. More specifically, the signal takes the path of least resistance traveling from retention arms 58*b* of clip 58 through forked clamps 58*a* to ground electrode 43 of gas tube 40 and thereafter through ground lead 23 diverting the voltage surge to ground. In one embodiment, a fusible element is chosen that melts at around 203 degrees Fahrenheit. However, embodiments of the present invention may be practiced with fusible elements that melt at different predetermined temperatures, or may be practiced without fusible elements 54.

In still other embodiments of the present invention, the central office surge protector may be configured as a 1-pin, a 4-pin, or other suitable configuration of a central office surge protector. In the 1-pin configuration, the single pin is electrically connected the ground element and the ring and tip elements are configured for inserting pins therein. As shown in FIG. 13, a tip arm 20' of a tip element 26', of a 1-pin configuration, includes a first end having a portion suitable for inserting a female contact, which in turn is suitable for inserting a pin therein. More specifically, a central office tip contact 14' and an outside plant tip contact 16' are inserted and electrically connected to the first end of tip arm 20'. Contacts 14' and 16' are suitable for inserting electrically conductive pins disposed on a connector block located at a telephone central office. Likewise, the 1-pin configuration includes a similar ring arm of the ring element having a central office ring contact and an outside plant ring contact electrically connected thereto. In other embodiments, a 4-pin configuration can be constructed by electrically connecting a female electrical contact to a suitable ground arm of a ground element with the two pins located on each of the tip and ring elements.

Additionally, the present invention may combine the surge protection characteristics of gas tube 40 and varistors 52 achieving a surge protector wherein varistors 52 interact with gas tube 40 within a range of DC breakdown voltages to divert surges to ground. For example, varistor 52 may be a metal oxide varistor (MOV) having predetermined protection characteristics. With gas tube 40 and varistors 52 interacting, better surge response is achieved. However, depending on its configuration with respect to gas tube 40, varistors 52 may act merely as a back up device instead of interacting with gas tube 40.

Gas tube 40 by its nature is difficult to repeatedly manufacture with a precise DC breakdown voltage. Consequently, for a given population of gas tubes 40, the DC breakdown voltage varies across a range that is wider than the ranges of the other components. Accordingly, for a particular gas tube and manufacturing type, an acceptable DC breakdown voltage range is determined by selecting a minimum and a maximum DC breakdown voltage. Each gas tube is tested, and only those gas tubes that fall within predetermined minimum and maximum breakdown voltages are passed, thereby creating a population of gas tubes that fall within a preselected range of DC breakdown voltages. If the DC breakdown voltage range is too small, then too large of a percentage of gas tubes that are manufactured are not used, and thus wasted. If the DC breakdown voltage range is too large, then the ability to properly combine varistors with any gas tube in the range becomes more difficult.

The DC breakdown voltage is the voltage at which a gas tube breaks down and diverts electricity to ground when the rate of rise of the voltage is sufficiently low such that the ionization time of the gas tube is not exceeded. When the rate of rise of voltage reaches surge levels, the gas tube breaks down at an impulse breakdown voltage that is higher than the DC breakdown voltage. The impulse breakdown voltage is higher than the DC breakdown voltage because the ionization time of the gas tube allowed the voltage to rise above the DC breakdown voltage level before the gas tube could divert the surge. The impulse breakdown voltage of the gas tube varies as a function of the rate of rise of the voltage and the time it takes for a particular gas tube to direct the voltage surge to ground is commonly termed its "operate time."

On the other hand, varistors clamp voltages and thereby prevent voltages from getting too high. Varistors are immediate and are not rate of rise dependent like the gas tube. Instead, the clamping voltage of a varistor is a function of current. As current increases, the clamping voltage of the varistor increases.

In one embodiment, a varistor is combined with a gas tube so that the varistor acts as a replacement for an air gap back-up, and the clamping voltage of the varistor is sufficiently higher than the DC breakdown voltage of the gas tube. Consequently, the impulse breakdown voltage of the gas tube is not appreciably affected. However, in another embodiment the clamping voltage of the varistor relative to the DC breakdown voltage of the gas tube is predetermined so that the varistor will clamp voltage surges during the ionization time of the gas tube, thereby lowering the impulse breakdown voltage of the gas tube. FIG. 5 illustrates an exemplary voltage response of the present invention whereby the interacting varistor acts to lower the impulse breakdown voltage by clamping the voltage surge until the gas tube responds.

However, even gas tubes made on the same manufacturing line have a wide range of DC breakdown voltages. The present invention takes into account the range of DC breakdown voltages of gas tubes by setting the varistor clamping voltage at a point to achieve optimal coordination between the varistor and any gas tube in the range of DC breakdown voltages as described below. Doing so balances two competing objectives, namely: 1) lowering the impulse breakdown voltage below that of a gas tube alone for any gas tube in the population; yet 2) allowing the gas tube to protect the varistor from being burned out for any gas tube in the population.

If the clamping voltage of the varistor is set too high, there may be some gas tubes at the low end of the range where the impulse breakdown voltage will not be lowered and the varistor operates merely as a back-up device. If the clamping voltage of the varistor is set too low, the varistor could be burned out before the gas tube can divert the surge to ground when the varistor is matched with a gas tube at the high end of the range of DC breakdown voltages.

In one embodiment, the difference between the minimum and the maximum DC breakdown voltage of gas tube 40 is between about 115 volts and about 155 volts, and more preferably is about 135 volts. Preferably the minimum DC breakdown voltage is about 265 volts and the maximum DC breakdown voltage is about 400 volts. The operate time of gas tube 40 is preferably between about 1 to about 20 microseconds.

In one embodiment, the clamping voltage of the varistor at 1 mA is set in the middle 60% of the range of the DC breakdown voltages, and more preferably, is set at about the middle of the range of the DC breakdown voltages. In the preferred range of DC breakdown voltages of 265 to 400 volts, the clamping voltage of the varistor is preferably between about 300 volts and about 400 volts or more. In these preferred ranges, the varistor can be selected to have a clamping voltage that will lower the impulse breakdown voltage of a gas tube with a DC breakdown voltage at 265 volts, and yet will not burn out when matched with a gas tube with a DC breakdown voltage of 400 volts. By way of example, a T67 gas tube may be used with two 5 mm metal oxide varistors both available from Epcos, Inc. of Chicago, Ill.

Figure 6:
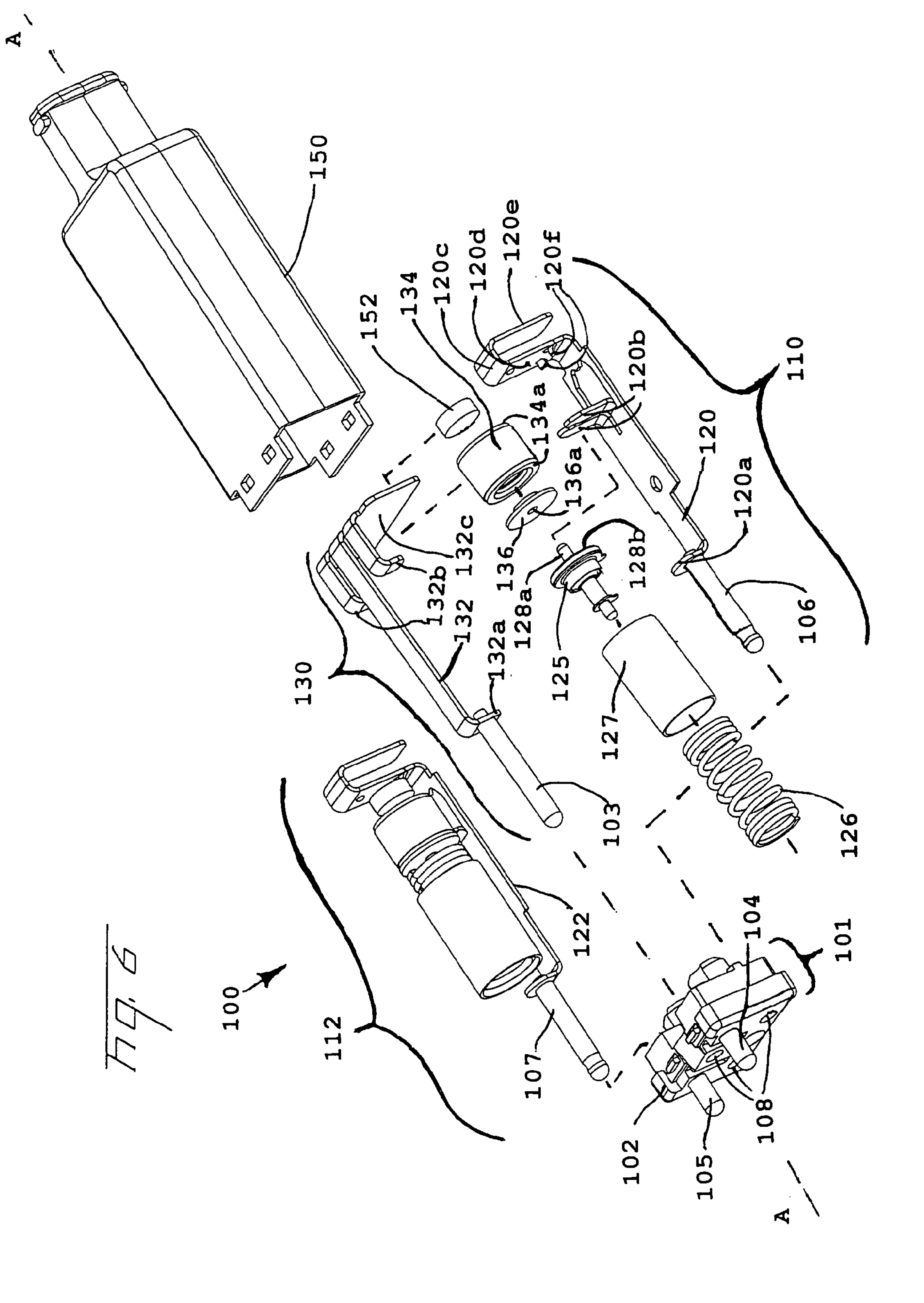
FIG. 6 is an exploded perspective view of a central office surge protector of yet another embodiment according to the present invention.
Figure 9:
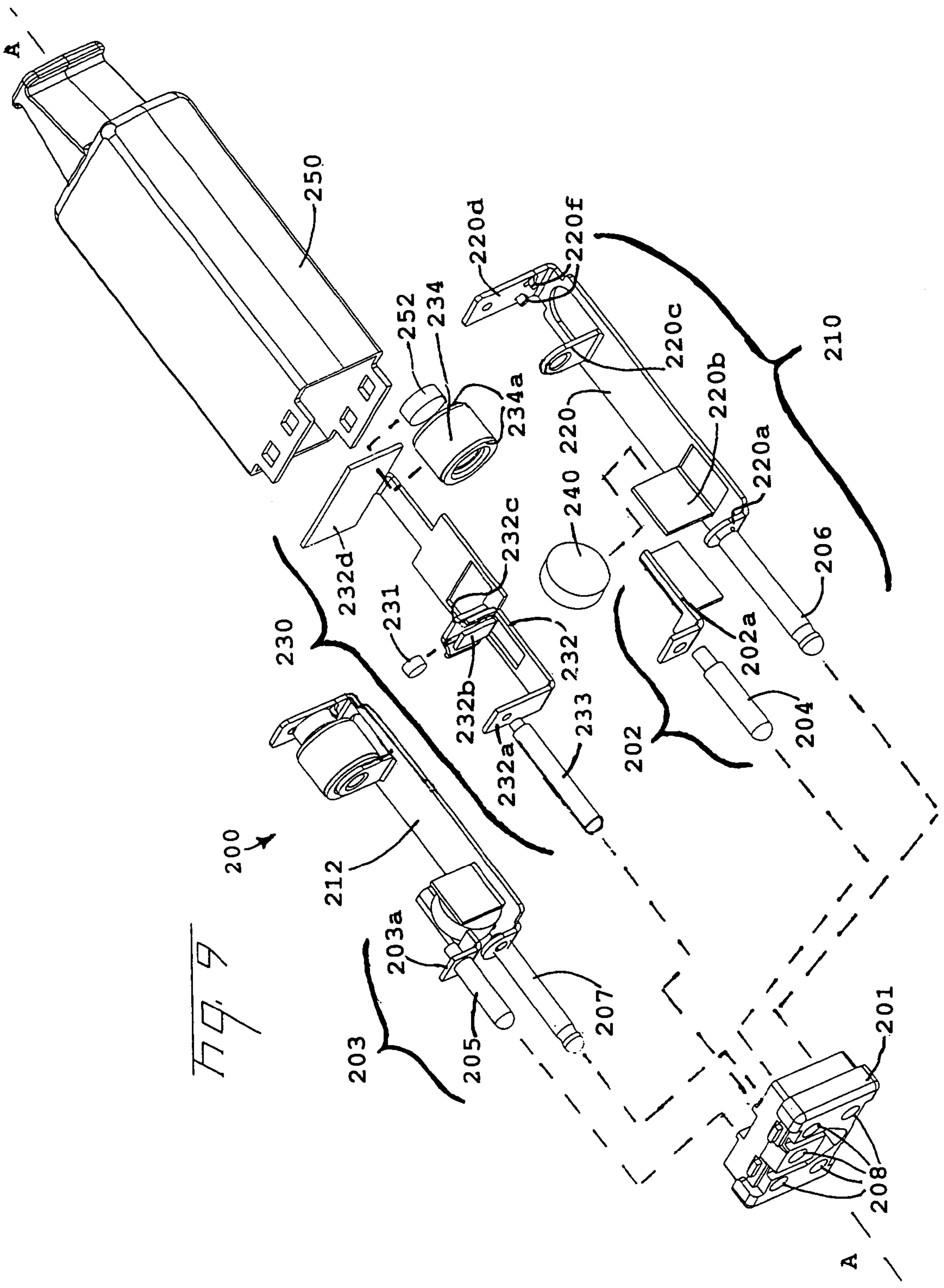
FIG. 9 is an exploded perspective view of a central office surge protector of still another embodiment according to the present invention.

FIGS. 6–8 depict a central office surge protector 100 in accordance with another embodiment of the present invention that provides sneak current protection. Protector 100 includes a base assembly 101, a tip element 110, a ring element 112, a ground element 130, a pair of varistors 152, and a cover 150. Base assembly 101 includes a base 102 made from a dielectric material for receiving a plurality of electrical inputs and outputs attached thereto. A central office tip pin 104 and a central office ring pin 105 are part of base assembly 101 and are inserted into predetermined apertures 108 of base 102.

As shown, tip element 110 and ring element 112 are similar, however, elements 110 and 112 may have different configurations and/or different components. Elements 110 and 112 include an electrically conductive arm, more specifically a tip arm 120 and a ring arm 122, respectively. The details of tip arm 120 will be explained with the understanding that in the embodiment depicted ring arm 122 is similar. Tip arm 120 includes a first end 120*a*, a pair of medial tabs 120*b*, and a second end 120*c*. First end 120*a* of tip arm 120 has an outside plant tip pin 106 electrically connected thereto. Disposed between first end 120*a* and medial tabs 120*b* of tip arm 120 is a heat coil assembly 125 that provides sneak current protection, an electrically conductive compression spring 126, and a cylindrical dielectric sleeve 127 that partially encloses spring 126. Heat coil assembly 125 may be, for example, a high resistance wire (not shown) wound on a metal sleeve 128*b* inside of which a contact pin 128*a* is held in a predetermined position by a fusible bonding material (not shown), for example, solder. When assembled contact pin 128*a* is held between medial tabs 120*b* and makes electrical contact with both tip arm 120 and lead electrode 134*a* of gas tube 134.

Outside plant tip pin 106 of tip element 110 is inserted into a predetermined aperture 108 of base 102 and a portion of spring 126 makes an electrical connection with central office tip pin 104. Likewise, outside plant ring pin 107 of ring element 112 is inserted into a predetermined aperture 108 of base 102 and a portion of the corresponding spring makes an electrical connection with central office ring pin 105.

Ground element 130, capable of being grounded, includes a ground plate 132 and a ground pin 103. Ground element 130 may be a single component or include multiple components. Ground plate 132 includes a first end tab 132*a* that is electrically connected to ground pin 103, a pair of medial tabs 132*b*, and a second end tab 132*c*. When assembled as illustrated in FIG. 8, one of a pair of lead electrodes 134*a* of gas tube 134 is electrically connected to second end tab 132*c* of ground plate 132. Adjacent to the other lead electrode 134*a* of gas tube 134 is gas tube insulator 136. Gas tubes 134 are arranged generally parallel to the longitudinal axis A of protector 100, however they may have other configurations. Second end tab 132*c* of ground plate 132 may include a surface that complements the surface of lead electrode 134*a* of gas tube 134, or it may be planar. Gas tube 134 may be a 2-element gas tube, for example, a N80-C400X gas tube available from Epcos, Inc. of Chicago, Ill. However other suitable gas tubes may be used. Moreover, other configurations may employ a three-element gas tube, for example, a T-60-C350XS gas tube available from Epcos, Inc. Gas tube insulator 136 has an aperture 136*a* and is made from a dielectric material to electrically insulate the respective lead electrode 134*a* of gas tube 134 from medial tab 120*b* of arm 120. One surface of insulator 136 may also have a profile that complements the surface of lead electrode 134*a* of gas tube 134, thereby inhibiting the insulator from sliding away from gas tube 134, or it may be a planar surface. When assembled, aperture 136*a* of insulator 136 allows contact pin 128*a* of assembly 125 to pass therethrough and make electrical contact with one lead electrode 134*a* of gas tube 134. Spring 126 is compressed by heat coil assembly 125 so that metal sleeve 128*b* of heat coil assembly 125 has a space and does not contact medial tab 132*b* of ground plate 132 or medial tabs 120*b* of tip arm 120. When assembled, the other lead electrode 134*a* of gas tube 134 is in electrical contact with second end tab 132*c* of ground plate 132. Additionally, medial tab 132*b* of ground plate 132 is sized so that when properly assembled contact pin 128*a* does not contact medial tab 132*b* or other portions of ground plate 132.

Varistor 152 is disposed between second end 120*c* of arm 120 and tab 132*c* of ground plate 132. More specifically, second end 120*c* of tip arm 120 includes a resilient portion that can provide a clamping force holding varistor 152. Resilient portion of second end 120*c* may be formed by sharply bending the second end 120*c* forming planar surfaces 120*d* and 120*e* that may be generally parallel. Planar surface 120*d* may include stops 120*f* that protrude from surface 120*d* keeping varistor 152 in a predetermined position. Varistor 152 may act as a back-up device or may be selected to interact with the gas tube to conduct voltage surges to ground as previously described.

During normal operation electrical current flow is from outside plant tip pin 106 to electrically conductive tip arm 120, through medial tabs 120*b*, through contact pin 128*a*, through heat coil assembly 125, to spring 126, and to central office tip pin 104. Likewise, during normal operation electrical current flow is from outside plant ring pin 105 to electrically conductive ring arm 122, through the medial tabs 120*b*, through contact pin 128*a*, through heat coil assembly 125, to spring 126, and to central office ring pin 107.

A sneak current condition occurs when an excessive current is present with no overvoltage. During a sneak current condition, heat coil assembly 125 attains a predetermined temperature, for example, 90° C. due to resistive heating. Should the predetermined temperature be reached and persist, the fusible bonding material (not shown) wound around metal sleeve 128*b* of heat coil assembly 125 will melt allowing metal sleeve 128*b* to be biased by compression spring 126 and thereby short tip arm 120 to ground. In particular, a flange of metal sleeve 128*b* is biased by spring 126 to electrically contact at least one medial tab 120*b* of tip arm 120 and at least one medial tab 132*b* of ground plate 132, thereby shorting the tip arm 120 to ground plate 132 through metal sleeve 128*b* and diverting the sneak current to ground.

Protectors having sneak current protection may also use a positive temperature coeffiecient (PTC) resistor, rather than heat coils. The PTC resistor prevents a sneak current condition by switching into a high-resistance mode to stop the current from flowing, thereby creating an open circuit upon reaching a predetermined, overcurrent-induced temperature threshold. Moreover, PTC resistors are self-resetting in that after the PTC returns to an operating temperature it will once again conduct current.

FIGS. 9–12 depict an exemplary central office protector 200 in accordance with yet another embodiment of the present invention that provides sneak current protection. Protector 200 includes a base 201, a first pair of tip and ring elements 202 and 203, a second pair of tip and ring elements 210 and 212, a ground element 230, a fusible element 231, a pair of gas tubes 234, a pair of PTC resistors 240, a pair of varistors 252, and a cover 250.

Base 201 is made from a dielectric material and includes a plurality of apertures 208 for receiving a plurality of electrical inputs and outputs attached thereto. A first tip element 202 includes a central office tip pin 204 and central office tip arm 202*a*. Likewise, a first ring element 203 includes a central office ring pin 205 and a central office ring arm 203*a*. Pins 204 and 205 of respective first elements 202 and 203 are inserted into predetermined apertures 208 of base 201.

As shown, second tip element 210 and second ring element 212 are similar, however, second tip element 210 and second ring element 212 may have different configurations and/or different components. Second elements 210 and 212 include an electrically conductive arm, more specifically a tip arm 220 and a ring arm 222, respectively. The details of tip arm 220 will be explained with the understanding that in the embodiment depicted ring arm 222 is similar. Tip arm 220 includes a first end 220*a*, a first tab 220*b*, a second tab 220*c*, and a second end 220*d*. First end 220*a* of tip arm 220 includes an outside plant tip pin 206 electrically connected thereto. Disposed between first end 220*a* and second end 220*d* is first tab 220*b* and second tab 220*c*.

When protector 200 is assembled, outside plant tip pin 206 of second tip element 210 is inserted into a predetermined aperture 208 of base 201. One of the PTC resistors 240 is disposed between a portion of central office tip arm 202*a* and first tab 220*b* of tip arm 220. Likewise, an outside plant ring pin 207 of second ring element 212 is inserted into a predetermined aperture 208 of base 201 and the other PTC resistor 240 is disposed between a portion of central office ring arm 203*a* and the first tab 222*b* of ring arm 222.

Ground element 230, capable of being grounded, includes a ground plate 232, a ground pin 233, and fusible element 231. Ground element 230 may be a single component or include multiple components. Ground plate 232 includes a first end tab 232*a* that is electrically connected to ground pin 233, a first medial tab 232*b*, a spring tab 232*c* and a second end tab 232*d*. Fusible element 231 is disposed between first medial tab 232*b* and spring tab 232*c*. As shown in FIG. 11, when protector 200 is assembled fusible element 231 biases spring tab 232*c* upwards preventing spring tab 232*c* from electrically contacting outside plant tip arm 220*b* and outside plant ring arm 222*b* by creating a gap g. If ground element 230 reaches a predetermined temperature, fusible element 231 melts allowing spring tab 232*c* to rotate and electrically contact first tabs 220*b* and 222*b* of tip arm 220 and ring arm 222, thereby shorting the arms 220 and 222 to ground.

Protector 200 includes the pair of gas tubes 234 each having a pair of lead electrodes 234*a*, for example, a N80-C400X gas tube available from Epcos, Inc. However, other suitable gas tubes may be used or other suitable embodiments of the present invention may use a single three-element gas tube. Gas tubes 234 are arranged generally parallel to the longitudinal axis A of protector 200, however they may have other configurations. Specifically, one gas tube 234 is electrically connected to tip arm 220 and the other gas tube 234 is electrically connected to ring arm 222. More specifically, when assembled one lead electrode 234*a* of one gas tube 234 is electrically connected to second tab 220*c* of tip arm 220 and the other lead electrode 234*a* of the same gas tube 234 is electrically connected to second end tab 232*d* of ground plate 232. The gas tube 234 electrically connected to ring arm 222 is similarly assembled. Second end tab 232*d* of ground plate 232 and/or second tab 220*c* of tip arm 220 may include a profile that complements the profile of lead electrode 234*a* for securing gas tube 234 in position, or the surfaces may be planar.

Varistor 252 is at least partially disposed between second end 220*d* of arm 220 and second end tab 232*d* of ground plate 232. More specifically, second tab 220*c* and second end 220*d* of tip arm 220 provide a resilient portion providing a clamping force holding varistor 252 between second end 220*d* of tip arm 220 and second end tab 232*d* of ground plate 232. Second end 220*d* of tip arm 220 may include stops 220*f* that protrude from the surface of second end 220*d* keeping varistor 252 in a predetermined position. Varistor may act as a back-up device or may be selected to interact with gas tube 234, as previously described, to conduct voltage surges to ground. In either instance, varistor 252 is electrically connected to tip arm 220 and ground plate 232.

During normal operation electrical current flow is from outside plant tip pin 206 to electrically conductive tip arm 220, through PTC resistor 240, through central office tip arm 202*a*, and to central office tip pin 204. Likewise, during normal operation electrical current flow is from outside plant ring pin 207 to electrically conductive ring arm 222, through PTC resistor 240, through central office ring arm 203*a*, and to central office ring pin 205.

A sneak current condition occurs when an excessive current is present with no overvoltage. During a sneak current condition, PTC resistor 240 attains a predetermined temperature, for example, 90° C. due to resistive heating and switches into a high-resistance mode, thereby creating an open circuit.

Many modifications and other embodiments of the present invention, within the scope of the appended claims, will become apparent to a skilled artisan. For example, any of the embodiments may be configured as a 4-pin or a 1-pin instead of a 5-pin central office surge protector. Additionally, the pair of two-element gas tubes may be replaced with a single three-element gas tube or vice versa. Electrical contacts may also be plated for environmental protection. Therefore, it is to be understood that the invention is not to be limited to the specific embodiments disclosed and that modifications and other embodiments may be made within the scope of the appended claims. Although specific terms are employed herein, they are used in a generic and descriptive sense only and not for purposes of limitation. The invention has been described with reference to surge protectors for use in a telephone central office, but the inventive concepts of the present invention are applicable to other protectors as well.

That which is claimed:

1. A central office surge protector comprising:

a tip element, the tip element comprising a tip arm and a tip lead that are electrically connected, the tip element further includes a first tip pin and a second tip pin that are configured for plugging into a socket;

a ring element, the ring element comprising a ring arm and a ring lead that are electrically connected, the ring element further includes a first ring pin and a second ring pin that are configured for plugging into a socket;

a ground element, the ground element having a ground lead and a pin, the ground pin being configured for plugging into a socket;

a three element gas tube, the three element gas tube having a longitudinal axis that is arranged generally parallel to a longitudinal axis of the central office surge protector, the three element gas tube having a first electrode in electrical contact with the tip lead, a second electrode in electrical contact with the ring lead, and a ground electrode in electrical contact with the ground lead, wherein the three element gas tube has a DC breakdown voltage and an impulse breakdown voltage, the impulse breakdown voltage being higher than the DC breakdown voltage; and at least one varistor; wherein the at least one varistor and the at least one gas tube are electrically connected in parallel to the ground element, the at least one varistor having a clamping voltage at 1 mA being set such that the varistor will lower the impulse breakdown voltage of the three element gas tube yet not burn out in response to surge voltages within a predetermined range of DC breakdown voltages.

2. The central office surge protector according to claim 1, the predetermined range of DC breakdown voltages being between about 265 volts and about 400 volts.

3. The central office surge protector according to claim 1, the clamping voltage of the varistor being at least about 300 volts.

4. The central office surge protector according to claim 1, the varistor being a metal oxide varistor (MOV).

5. The central office surge protector according to claim 4, the clamping voltage of the metal oxide varistor being at least about 300 volts.

6. The central office surge protector according to claim 1, further comprising a fusible element being operable to melt at a predetermined temperature to thereby short the central office surge protector to ground.

7. A central office surge protector comprising:

a tip element, the tip element comprising a tip arm and a tip lead that are electrically connected, the tip element further includes a first tip pin and a second tip pin that are configured for plugging into a socket;

a ring element, the ring element comprising a ring arm and a ring lead that are electrically connected, the ring element further includes a first ring pin and a second ring pin that are configured for plugging into a socket;

a ground element, the ground element comprising a ground arm and a ground lead that are electrically connected, the ground element further includes a ground pin configured for plugging into a socket;

at least one pin, the at least one pin being electrically connected to one of the tip element, the ring element and the ground element;

a three element gas tube, the three element gas tube having a longitudinal axis that is arranged generally parallel to a longitudinal axis of the central office surge protector, the three element gas tube having an impulse breakdown voltage and a DC breakdown voltage, the DC breakdown voltage being in a range between a predetermined minimum and maximum value, and the impulse breakdown voltage being higher than the predetermined maximum DC breakdown voltage; and at least one varistor; wherein the at least one varistor and the three element gas tube are electrically connected in parallel to the ground element, the at least one varistor has a clamping voltage at 1 mA between the predetermined minimum and maximum DC breakdown voltages of the three element gas tube, and the varistor clamps the voltage during a voltage surge to reduce the impulse breakdown voltage of the gas tube without the varistor burning out.

8. The central office surge protector according to claim 7, the predetermined range of DC breakdown voltages being between about 265 volts and about 400 volts.

9. The central office surge protector according to claim 7, the clamping voltage of the varistor being at least about 300 volts.

10. The central office surge protector according to claim 7, the varistor being a metal oxide varistor (MOV).

11. The central office surge protector according to claim 7, the clamping voltage of the metal oxide varistor being at least about 300 volts.

12. The central office surge protector according to claim 7, further comprising a fusible element being operable to melt at a predetermined temperature to thereby short the central office surge protector to ground.

* * * * *